US012636765B2

(12) United States Patent
Liu et al.

(10) Patent No.: US 12,636,765 B2
(45) Date of Patent: May 26, 2026

(54) LIFT ASSEMBLY AND ELECTRIC NAIL GUN HAVING THE SAME

(71) Applicant: BASSO INDUSTRY CORP., Taichung (TW)

(72) Inventors: An-Gi Liu, Taichung (TW); Chang-Sheng Lin, Taichung (TW)

(73) Assignee: BASSO INDUSTRY CORP., Taichung (TW)

( * ) Notice: Subject to any disclaimer, the term of this patent is extended or adjusted under 35 U.S.C. 154(b) by 0 days.

(21) Appl. No.: 19/056,293

(22) Filed: Feb. 18, 2025

(65) Prior Publication Data

US 2025/0269507 A1 Aug. 28, 2025

(30) Foreign Application Priority Data

Feb. 22, 2024 (TW) ................................ 113106290

(51) Int. Cl.
*B25C 1/04* (2006.01)
*B25C 1/00* (2006.01)
*B25C 1/06* (2006.01)

(52) U.S. Cl.
CPC ................ *B25C 1/047* (2013.01); *B25C 1/06* (2013.01); *B25C 1/008* (2013.01)

(58) Field of Classification Search
CPC ............ B25C 1/047; B25C 1/06; B25C 1/008
USPC ........................................................ 227/130
See application file for complete search history.

(56) References Cited

U.S. PATENT DOCUMENTS

| | | | | |
|---|---|---|---|---|
| 5,146,634 | A | 9/1992 | Hunt | |
| 10,946,506 | B1 | 3/2021 | Ueda | |
| 11,724,378 | B2 * | 8/2023 | Ueda | B25F 5/008 227/130 |
| 2023/0364761 | A1 * | 11/2023 | Baba | B25C 1/047 |
| 2023/0364762 | A1 * | 11/2023 | Baba | B25C 1/047 |
| 2023/0364763 | A1 * | 11/2023 | Nagao | B25C 1/06 |

* cited by examiner

*Primary Examiner* — Michelle Lopez
(74) *Attorney, Agent, or Firm* — BURRIS LAW, PLLC

(57) ABSTRACT

A lift assembly for use in an electric nail gun includes a wheel unit, a wheel axle unit, and a buffer unit. The wheel unit is rotatable about an axis, and includes a plurality of roller members arranged along a circumference surrounding the axis, and an inner action surface. The wheel axle unit is rotatable about the axis, is detachably sleeved on a portion of the wheel unit, and has an outer action surface movable along the circumference, spaced apart from the wheel unit, and operable to exert a force on the inner action surface to drive rotation of the wheel unit when the wheel axle unit is energized. The buffer unit includes a buffer member disposed between the inner action surface and the outer action surface along the circumference.

14 Claims, 10 Drawing Sheets

LIFT ASSEMBLY AND ELECTRIC NAIL GUN HAVING THE SAME

CROSS-REFERENCE TO RELATED APPLICATION

This application claims priority to Taiwanese Invention Patent Application No. 113106290, filed on Feb. 22, 2024, the entire disclosure of which is incorporated by reference herein.

FIELD

The disclosure relates to a lift assembly, and more particularly to an electric nail gun having the same.

BACKGROUND

A conventional electric nail gun disclosed in U.S. Pat. No. 10,946,506 discloses an electric nail gun that includes a cylinder storing air therein, a piston driven by air pressure in the cylinder to strike a nail in a first direction, a lifting gear driven by a motor to move the piston in a second direction opposite to the first direction to compress air in the cylinder, and a damper disposed in the cylinder for absorbing kinetic energy of the piston exerted thereon after the piston strikes a nail.

When the piston is driven to move in the first direction and thus strikes the nail and then impacts the damper, the piston bounces back and forth in the first direction and the second direction by virtue of the damper. At this time, since the lifting gear engages the piston to move the piston in the second direction to compress air in the cylinder, bouncing movement of the piston in the first direction may cause jamming between the lifting gear and the piston and exert an undesired force on the motor through the lifting gear. Consequently, the lifting gear may get stuck with the piston, and the motor may be damaged due to the undesired force exerted thereon.

SUMMARY

Therefore, an object of the present disclosure is to provide a lift assembly and an electric nail gun having the lift assembly that has a configuration which is different from the abovementioned prior art.

According to an aspect of the disclosure, a lift assembly is adapted for use in an electric nail gun. The electric nail gun includes a main body unit, a strike unit that is operable to start a striking cycle, a cylinder unit that is mounted to the main body unit, that stores air therein, and that is isolated from an external environment during the striking cycle, and a strike pin that is movable in a nail-striking direction by air pressure in the cylinder unit from a pre-striking position to a post-striking position to strike a nail. The strike pin includes a driven protrusion, the lift assembly includes a wheel unit, a wheel axle unit, and a buffer unit. The wheel unit is rotatable about an axis perpendicular to the nail-striking direction, is adapted to be mounted to the main body unit, and includes a plurality of roller members and an inner action surface. The plurality of roller members are arranged along a circumference surrounding the axis. A selected one of the plurality of roller members is adapted to detachably engage the driven protrusion of the strike pin to thereby drive the strike pin from the post-striking position to the pre-striking position. The inner action surface is movable along the circumference. The wheel axle unit is rotatable about the axis, is detachably sleeved on a portion of the wheel unit, and has an outer action surface movable along the circumference, spaced apart from the wheel unit, and operable to exert a force on the inner action surface to drive rotation of the wheel unit when the wheel axle unit is energized. The buffer unit includes at least one buffer member disposed between the inner action surface and the outer action surface along the circumference.

According to another aspect of the disclosure, an electric nail gun includes a main body unit, a lift assembly as described above, a cylinder unit, and a strike unit. The main body unit includes a trigger unit operable to start a striking cycle. The lift assembly is mounted to the main body unit. The cylinder unit is mounted to the main body unit, and includes an air storage chamber storing air therein and isolated from an external environment during the striking cycle, and a cylinder chamber in spatial communication with the air storage chamber. The strike unit is inserted in the cylinder chamber, and includes a strike pin movable in a nail-striking direction by air pressure in the cylinder unit from the pre-striking position to the post-striking position to strike a nail. The strike pin includes a driven protrusion.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
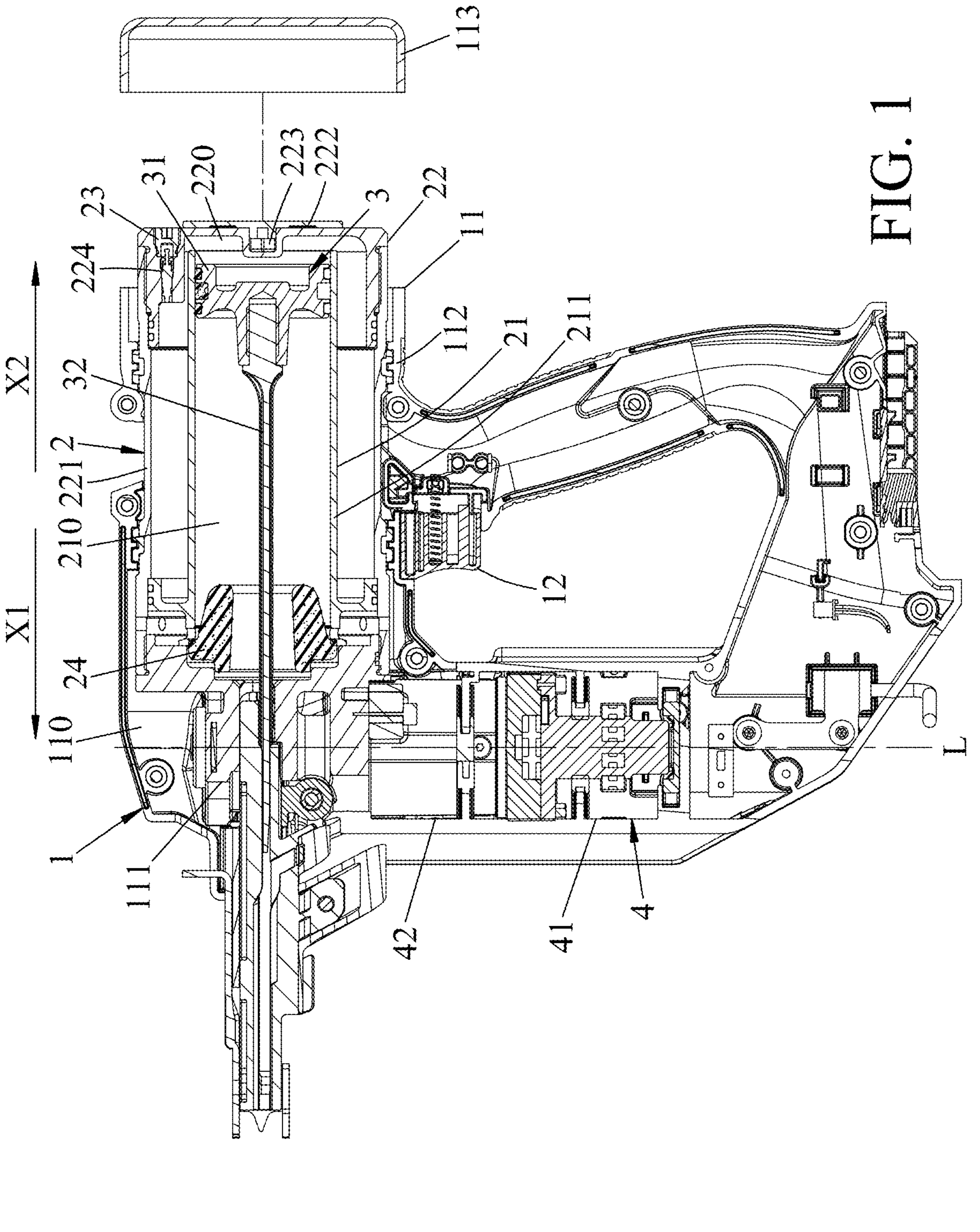
FIG. 1 is a fragmentary sectional view of an electric nail gun of an embodiment according to the present disclosure.

It should be noted herein that for clarity of description, spatially relative terms such as “top,” “bottom,” “upper,” “lower,” “on,” “above,” “over,” “downwardly,” “upwardly” and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
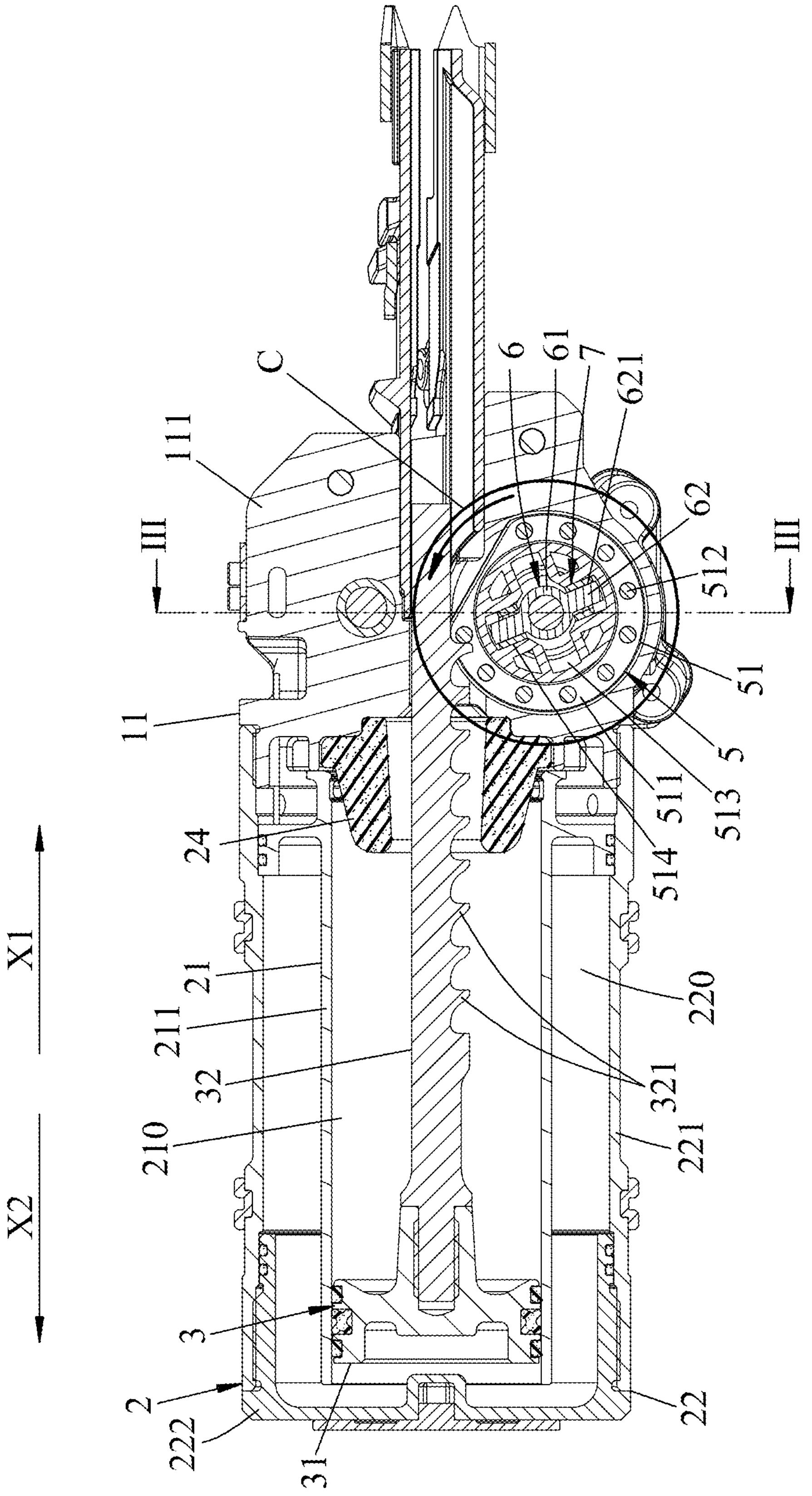
FIG. 2 is another fragmentary sectional view of the embodiment, illustrating a strike pin of the embodiment being disposed in a pre-striking position.
Figure 3:
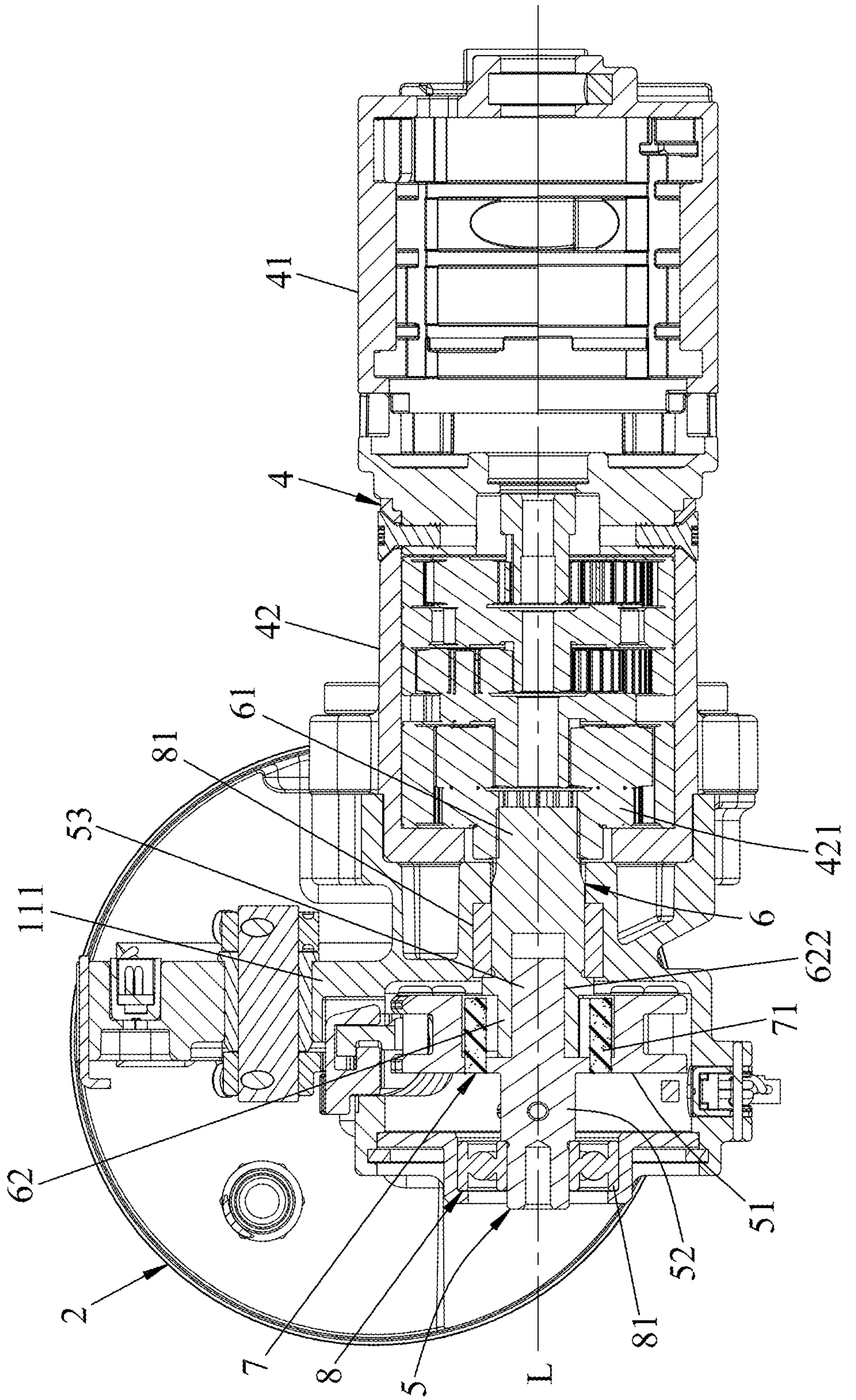
FIG. 3 is a sectional view taken along line III-III in FIG. 2.

Referring to FIGS. 1 to 3, an embodiment of an electric nail gun according to the present disclosure includes a main body unit 1, a cylinder unit 2, a strike unit 3, a motor unit 4, and a lift assembly. The lift assembly includes a wheel unit 5, a wheel axle unit 6, a buffer unit 7, and a support unit 8.

The main body unit 1 includes a main body 11, and a trigger unit 12 mounted to the main body 11. The main body 11 includes a muzzle seat 111, a housing 112 connected to the muzzle seat 111, and a rear cover 113 detachably connected to the housing 112 and cooperating with the housing 112 to define an accommodating space 110. The trigger unit 12 is operable to start a striking cycle. The striking cycle refers to a period from the time that the strike unit 3 starts to move from a standby position (not shown) to a pre-striking position (see FIG. 2) and then moves from the pre-striking position to a post-striking position (see FIG. 7) to strike a nail until the time that the strike unit 3 moves back to the standby position.

The cylinder unit 2 is mounted in the accommodating space 110 of the main body 11, and includes a strike cylinder 21, an air storage cylinder 22, an air supply valve 23, and an elastic member 24.

The strike cylinder 21 includes a strike cylinder body 211 disposed in the air storage cylinder 22 and defining a cylinder chamber 210 therein.

The air storage cylinder 22 includes a storage cylinder body 221 surrounding the strike cylinder body 211 of the strike cylinder 21, and a storage cylinder cover 222 connected to the storage cylinder body 221 and cooperating with the storage cylinder body 221 and an outer surface of the strike cylinder 21 to define an air storage chamber 220. The air storage chamber 220 stores air therein, is in spatial communication with the cylinder chamber 210, and is isolated from an external environment during the striking cycle. The storage cylinder cover 222 has a recess 223 adapted to be operated by a hexagonal wrench (not shown) to be detachably connected to the storage cylinder body 221, and a valve hole 224 extending therethrough in a direction of an axis (L), and located between the storage cylinder body 221 and the strike cylinder body 211 of the strike cylinder 21. The valve hole 224 is in spatial communication with the air storage chamber 220. In this embodiment, the storage cylinder cover 222 threadedly engages the storage cylinder body 221 and may be loosened from and connected to the storage cylinder body 221 by the hexagonal wrench operating thereon.

The air supply valve 23 is mounted to the storage cylinder cover 222, extends into the valve hole 224 of the storage cylinder cover 222 in a nail-striking direction (X1) perpendicular to the axis (L), is disposed proximate to the rear cover 113, and is operable to supply air to the air storage chamber 220. Since the valve hole 224 is formed in the storage cylinder cover 222 and the air supply valve 23 is mounted in the valve hole 224, the air supply valve 23 is disposed proximate to the rear cover 113 and is rotatable with the storage cylinder cover 222 when the storage cylinder cover 222 is operated by the hexagonal wrench.

The elastic member 24 is disposed in the cylinder chamber 210, and is located at an end of the cylinder chamber 210 that is proximate to the muzzle seat 111. In this embodiment, the air storage chamber 220 stores air having an air pressure that is equal to or greater than a predetermined threshold sufficient for striking a nail. In fact, only when the air pressure in the air storage chamber 220 drops below the predetermined threshold will the air storage chamber 220 that is connected to an external air source (not shown) via the air supply valve 23 begin to supply air to the air storage chamber 220. Specifically, in such case, the rear cover 113 is detached from the housing 112, and the air supply valve 23 is connected to the external air source (not shown) to supply air to the air storage chamber 220 until the air pressure therein is equal to or greater than the predetermined threshold.

The strike unit 3 is inserted in the cylinder chamber 210, is movable relative to the cylinder unit 2 in the nail-striking direction (X1) and a pressure-generating direction (X2) opposite to the nail-striking direction (X1), and includes a piston 31 and a strike pin 32. The piston 31 is in airtight contact with an inner surface of the strike cylinder 21. The strike pin 32 is co-movably connected to the piston 31 and is movable in the nail-striking direction (X1) by air pressure in the cylinder unit 2 from the pre-striking position to the post-striking position to strike a nail. The strike pin 32 has a plurality of driven protrusions 321 protruding from a longitudinal side of the strike pin 32 and spaced apart from each other.

Figure 7:
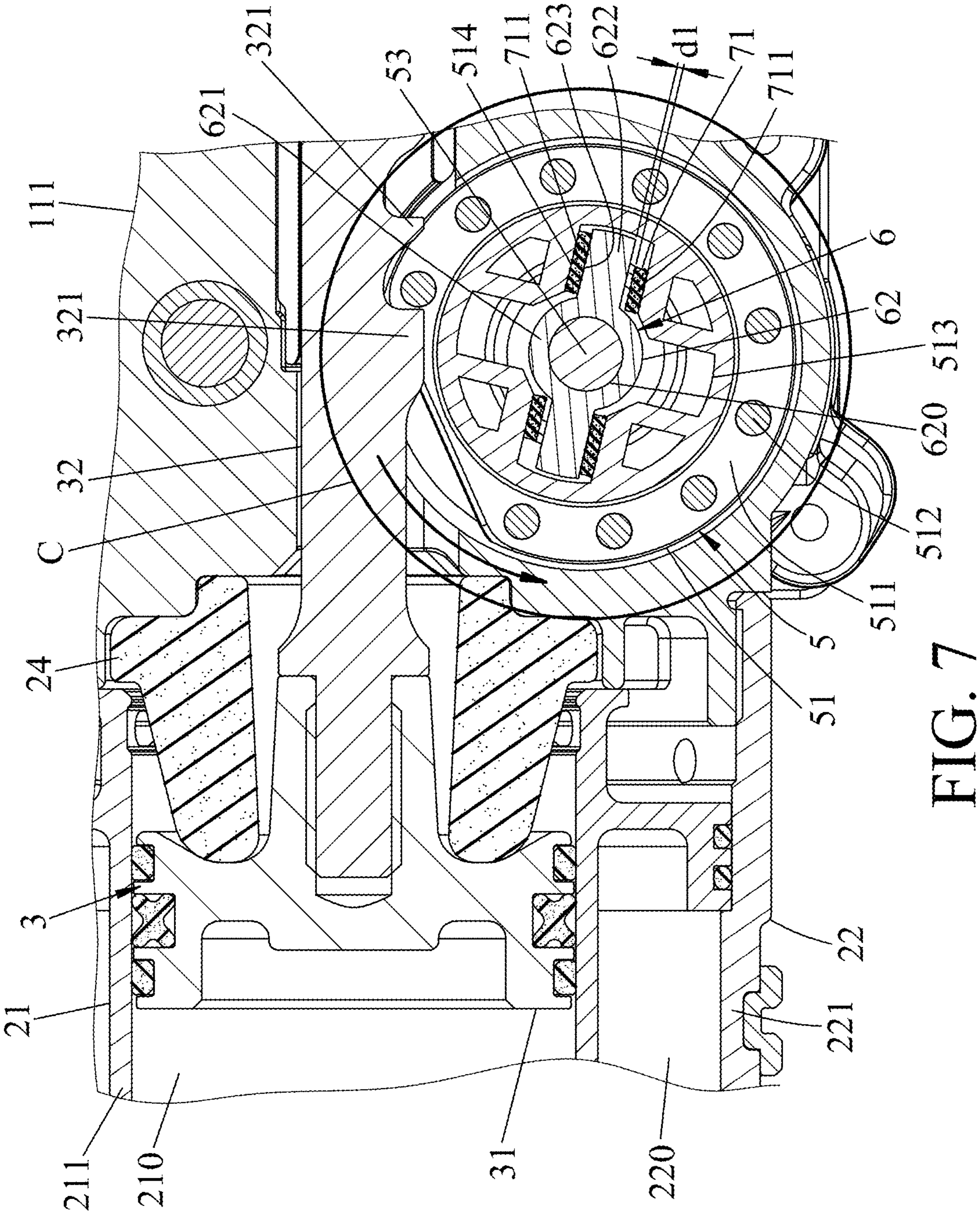
FIG. 7 is a fragmentary sectional view of the embodiment, illustrating the strike pin being disposed in a post-striking position, and the wheel unit being rotated in a counterclockwise direction.
Figure 8:
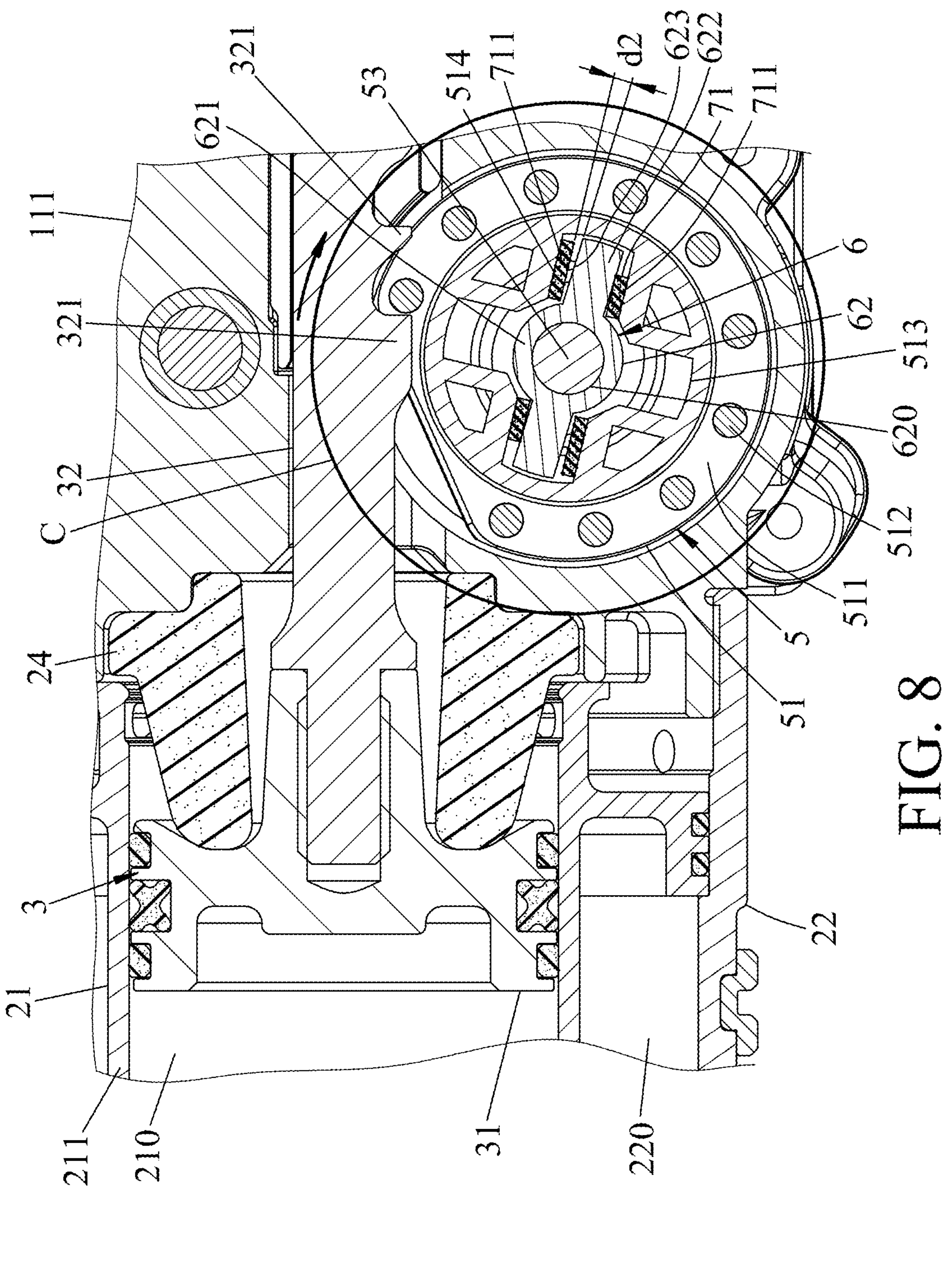
FIG. 8 is a view similar to FIG. 7, but illustrating the wheel unit being rotated in a clockwise direction.

The strike unit 3 is movable in the nail-striking direction (X1) and the pressure-generating direction (X2) among the standby position (not shown), the pre-striking position (see FIG. 2), and the post-striking position (see FIGS. 7 and 8). When the strike pin 32 moves from the standby position to the pre-striking position, air pressure in the air storage chamber 220 is increased and the strike pin 32 is moved to a top dead center of the air storage cylinder 22. In this position, the piston 31 is disposed farther away from the elastic member 24 than the strike pin 32 is in the standby position and is spaced apart from the storage cylinder cover 222 by a minimum distance in the nail-striking direction (X1). When the strike pin 32 moves from the pre-striking position to the post-striking position, the strike pin 32 is driven by air pressure in the air storage chamber 220 to strike the nail. As shown in FIGS. 7 and 8, the strike pin 32 is disposed at a bottom dead center of the air storage cylinder 22 when in the post-striking position, and the piston 31 is disposed adjacent to and in contact with the elastic member 24 and is farther from the storage cylinder cover 222 than the strike pin 32 is in the standby position and the pre-striking position. When the strike pin 32 is disposed in the standby position, the piston 31 is disposed in a position between the top dead center and the bottom dead center of the air storage cylinder 220.

As shown in FIG. 3, the motor unit 4 is mounted to the muzzle seat 111, and is sleeved on the wheel axle unit 6. The motor unit 4 includes a motor 41 converting electric power into kinetic energy, and a reduction gear set 42 driven by the motor 41 to rotate. Specifically, the reduction gear set 42 includes a rotatable shaft 421 configured to output kinetic energy from the motor 41 and is driven to rotate when the trigger unit 12 is operated to start the striking cycle.

Referring to FIGS. 2 and 4 to 6, the wheel unit 5 is rotatable about the axis (L) and is mounted to the muzzle seat 111 of the main body 11 of the main body unit 1. The wheel unit 5 includes a wheel body 51, a first shaft member 52 connected to the wheel body 51 and extending along the axis (L), and a second shaft member 53 connected to the wheel body 51 and opposite to the first shaft member 52 along the axis (L).

Figure 4:
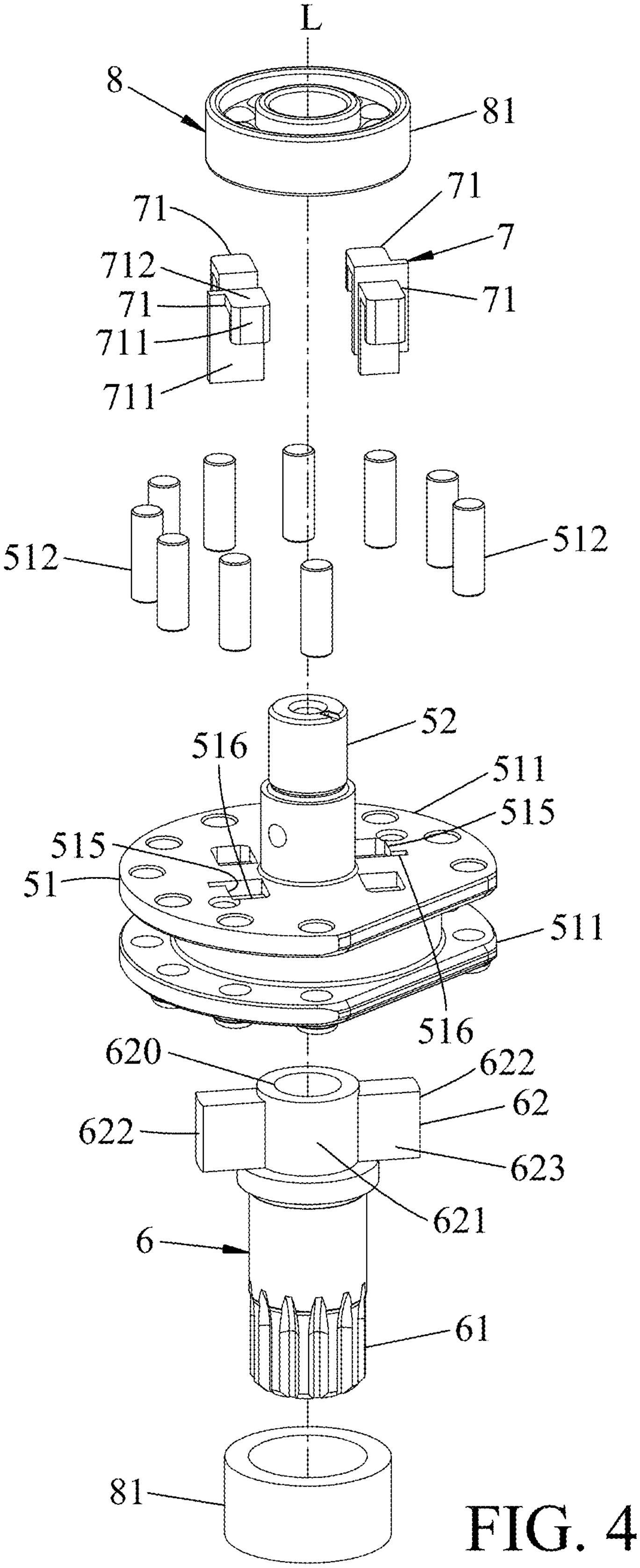
FIG. 4 is a partly exploded perspective view of a lift assembly of the electric nail gun of the embodiment.

The wheel body 51 has two disc members 511 spaced apart from each other along the axis (L), a plurality of roller members 512 connected to and disposed between the disc members 511 and arranged along a circumference (C) surrounding the axis (L), and an inner action surface 514 defining a polygonal axial hole 513 and movable along the circumference (C). As shown in FIG. 4, an upper one of the disc members 511 along the axis (L) has a plurality of grooves 515 formed in an upper surface of the upper one of the disc members 511 and arranged around the axis (L), and a plurality of slots 516 each extending from a corresponding one of the grooves 515 along the axis (L). A selected one of the roller members 512 detachably engages one of the driven protrusions 321 of the strike pin 32 to thereby drive the strike pin 32 from the post-striking position to the standby position, or from the standby position to the pre-striking position. In this embodiment, two of the slots 516 respectively extend from two opposite ends of the corresponding one of the grooves 515 along the axis (L), cooperate therewith to form a substantially U-shaped space thereamong, and are in spatial communication with the polygonal axial hole 513. In this embodiment, the polygonal axial hole 513 is configured as a cross.

As shown in FIG. 3, the first shaft member 52 is inserted into the muzzle seat 111 of the main body 11 and is rotatable about the axis (L).

The wheel axle unit 6 extends along the axis (L), is rotatable about the axis (L), is opposite to the first shaft member 52 of the wheel unit 5, and is detachably sleeved on the second shaft member 53 of the wheel unit 5. The wheel axle unit 6 includes a first transmission part 61, and a second transmission part 62 opposite to the first transmission part 61 along the axis (L) and extending into the polygonal axial hole 513. The first transmission part 61 is in key engagement with and is co-rotatable with the rotatable shaft 421 of the motor unit 4 (see FIG. 3) such that the motor unit 4 drives rotation of the wheel axle unit 6 when the trigger unit 12 is operated to start the striking cycle. The second transmission part 62 extends into the polygonal axial hole 513 and engages the polygonal axial hole 513. Specifically, the second transmission part 62 has an annular body portion 621 surrounding the axis (L) and defining a through hole 620 that is formed in an end surface thereof along the axis (L), and two wing portions 622 extending from an outer peripheral surface of the annular body portion 621 away from each other. In this embodiment, each of the wing portions 622 is substantially rectangular, and has an outer action surface 623 movable along the circumference (C), spaced apart from the inner action surface 514 of the wheel unit 5, and operable to exert a force on the inner action surface 514 to drive rotation of the wheel unit 5 when the axle unit 6 is energized, i.e., driven by the motor unit 4 to rotate. The second shaft member 53 extends into the through hole 620 and is connected to the wheel axle unit 6.

Figure 5:
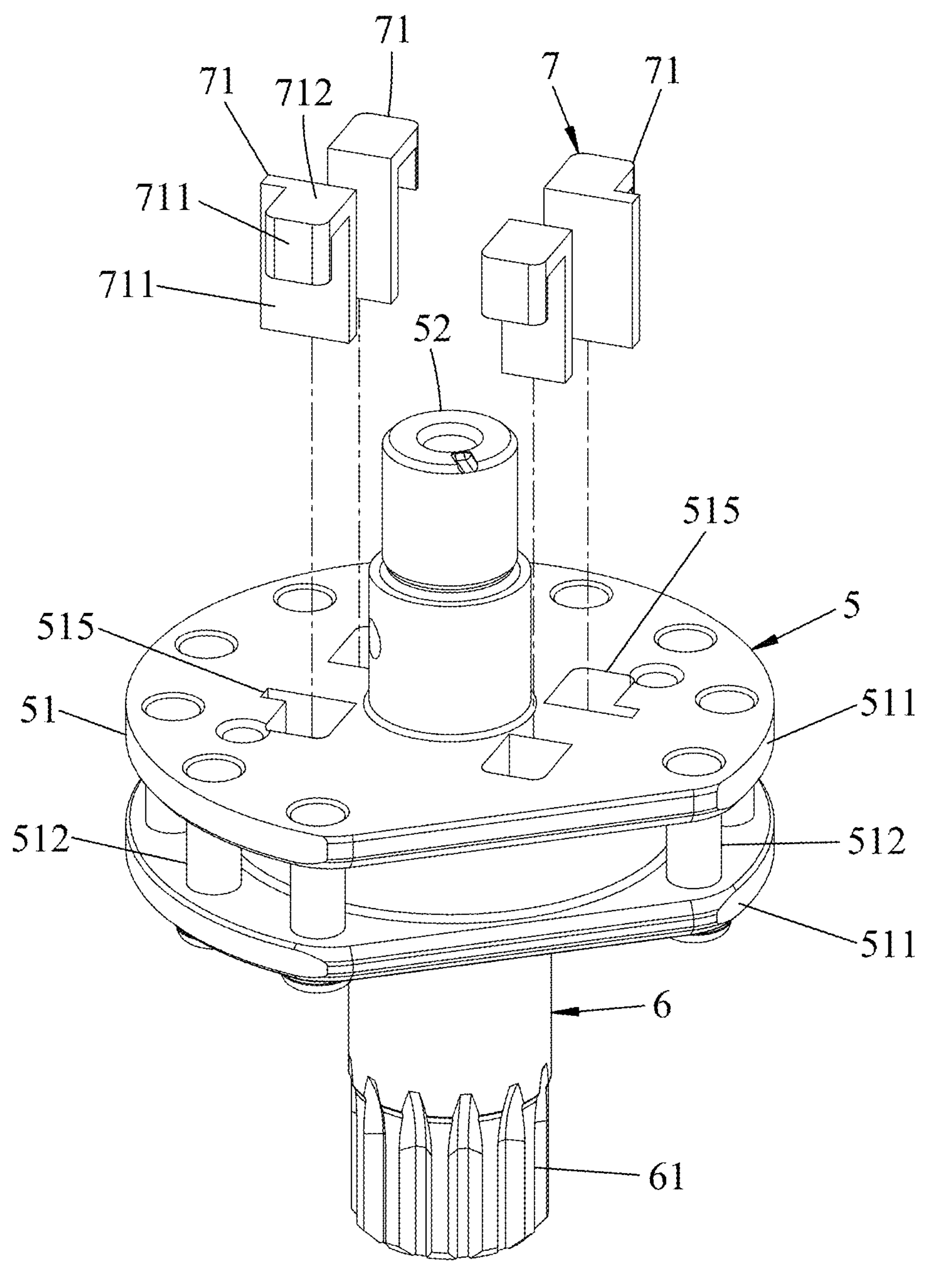
FIG. 5 is a fragmentary, partly exploded perspective view of the lift assembly.
Figure 6:
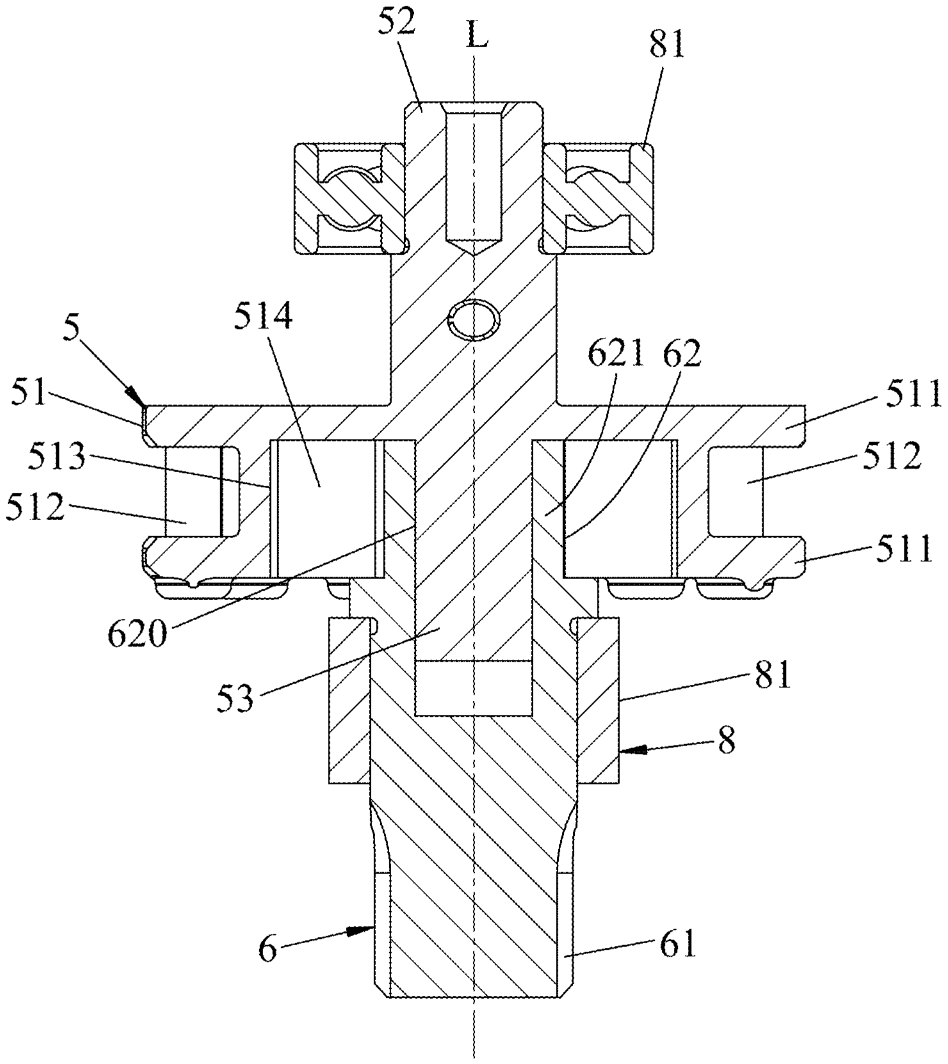
FIG. 6 is a schematic sectional view of the lift assembly, illustrating a wheel axle unit and a wheel unit of the lift assembly.

The buffer unit 7 includes a plurality of buffer members 71. Each of the buffer members 71 has two buffer portions 711 that are opposite to each other along the circumference (C), that extend along a direction of the axis (L), and that are disposed between the inner action surface 514 and the outer action surface 623 of each of the wing portions 622 along the circumference (C), and a connecting portion 712 connected to upper portions of the buffer portions 711 as depicted in FIG. 4, such that each of the buffer members 71 is substantially U-shaped. In this embodiment, for each of the buffer members 71, the connecting portion 712 engages a respective one of the grooves 515, the buffer portions 711 face each other and extend respectively into the two slots 516 of the corresponding one of the grooves 515, and one of the buffer portions 711 has a length longer than that of another one of the buffer portions 711 along the axis (L). As shown in FIGS. 4 and 5, in this embodiment, the buffer unit 7 includes four of the buffer members 71, in which two of the buffer members 71 have identical structures while another two of the buffer members 71 that have identical structures are different in structure from the two of the buffer members 71. In other embodiments, the four of the buffer members 71 may have identical structures and the buffer unit 7 may include only two of the buffer members 71.

It should be further noted that the number of the buffer portions 711 of each of the buffer members 71 is not limited to four, and may be one or more than four. Furthermore, the configuration of the buffer portions 711 of each of the buffer members 71 may be modified to have different shapes and sizes in other embodiments of the present disclosure as long as the buffer portions 711 are disposed between the inner action surface 514 and the outer action surface 623 of each of the wing portions 622.

The support unit 8 includes two ring members 81. One of the ring members 81 is disposed between the first shaft member 52 and the muzzle seat 111 of the main body 11 to permit rotation between the first shaft member 52 and the muzzle seat 111. Another one of the ring members 81 is disposed between the first transmission part 61 and the muzzle seat 111 to permit rotation between the first transmission part 61 and the muzzle seat 111. Each of the ring members 81 is one of a bearing and a bushing. In this embodiment, the one of the ring members 81 disposed between the first shaft member 52 and the muzzle seat 111 is a bearing and another one of the ring members 81 disposed between the first transmission part 61 and the muzzle seat 111 is a bushing.

Generally, when the strike unit 3 is in the standby position, a selected one of the roller members 512 abuts against a respective one of the driven protrusions 321 of the strike pin 32 to block movement of the strike pin 32 and the piston 31 in the nail-striking direction (X1) so as to obstruct the strike pin 32 from moving to the nail-striking position. In this way, an unintentional nail striking may be prevented.

As shown in FIGS. 2 and 3, when the trigger unit 12 (see FIG. 1) is operated by a user to start the striking cycle, the motor unit 4 drives rotation of the wheel axle unit 6 in a counterclockwise direction (indicated by an arrow in FIG. 2) along the circumference (C) through key engagement between the rotatable shaft 421 and the first transmission part 61 of the wheel axle unit 6. At this time, the second transmission part 62 is rotated in the counterclockwise direction until the outer action surface 623 of one of the wing portions 622 of the second transmission part 62 abuts against one of the buffer portions 711 of a respective one of the buffer members 71, and then the second transmission part 62 is continuously rotated to exert a force on the inner action surface 514 of the wheel body 51 in the counterclockwise direction, thereby driving rotation of the wheel unit 5. When the wheel unit 5 is rotated in the counterclockwise direction, a selected one of the roller members 512 engages one of the driven protrusions 321 of the strike pin 32 to move the strike pin 32 in the pressure-generating direction (X2) toward the pre-striking position, i.e., the top dead center. When the strike pin 32 is moved from the standby position to the pre-striking position, the outer action surface 623 of one of the wing portions 622 of the second transmission part 62 becomes spaced apart from the one of the buffer portions 711 of the respective one of the buffer members 71 and defines a first gap (d1), which can be seen in FIG. 7, therebetween.

In this way, as the wheel unit 5 is continuously rotated to move the strike pin 32 from the standby position to the pre-striking position, the roller members 512 sequentially push the driven protrusions 321 to move the strike pin 32 in the pressure-generating direction (X2) until the roller members 512 do not engage the driven protrusions 321. At this position, the strike pin 32 is not blocked by roller members

512. Thus, the piston 31 may be pushed by air pressure in the air storage chamber 220 to urge the strike pin 32 to move in the nail-striking direction (X1) so as to strike the nail (not shown) disposed in the muzzle seat 111, and thus the piston 31 is moved to the post-striking position and impacts and abuts against the elastic member 24.

It should be noted that the piston 31 bounces back and forth in the nail-striking direction (X1) and the pressure-generating direction (X2) by virtue of the elastic member 24. As a result, since the strike pin 32 is co-movable with the piston 31, the wheel unit 5 may be driven to rotate in the counterclockwise direction and a clockwise direction opposite to the counterclockwise direction through engagement among the driven protrusions 321 and the roller members 512. During rotation of the wheel unit 5 in the clockwise direction, the wheel unit 5 first idles for a distance, i.e., the first gap (d1), toward a position shown in FIG. 8, and then the buffer members 71 absorb a force exerted by the inner action surface 514 thereon to decrease impact on the outer action surfaces 623 of the wing portions 622 of the second transmission part 62 and thus reduce undesirable clockwise rotation of the wheel axle unit 6. In this way, damage to the motor unit 4 that is connected to the wheel axle unit 6 and that is designed to rotate in the counterclockwise direction resulting from clockwise rotation of the wheel unit 5 may be prevented by virtue of the first gap (d1) and the buffer members 71. It should be noted that when the wheel unit 5 is rotated to the position shown in FIG. 8, the outer action surface 623 of one of the wing portions 622 of the second transmission part 62 is spaced apart from the one of the buffer portions 711 of the respective one of the buffer members 71 and defines a second gap (d2) therebetween.

Similarly, during rotation of the wheel unit 5 in the counterclockwise direction, the wheel unit 5 first idles for a distance, i.e., the second gap (d2), and then the buffer members 71 absorb the force exerted thereon to decrease impact on the inner action surface 514 and thus reduce undesirable rotation of the wheel unit 5. In this way, the second gap (d2) and the buffer members 71 are useful in absorbing force resulting from counterclockwise rotation of the wheel unit 5.

After the nail-striking operation is completed, the strike pin 32 is at the post-striking position, and then the motor unit 4 continues to drive rotation of the wheel unit 5 in the counterclockwise direction through the wheel axle unit 6 so that the roller members 512 sequentially engage the driven protrusions 321 of the strike pin 32 to move the strike pin 32 (and the piston 31) in the pressure-generating direction (X2) such that air in the air storage chamber 220 is pressurized to the predetermined threshold and the strike pin 32 (and the piston 31) are moved to the standby position. By repeating the abovementioned procedure, function of a pneumatic nail-striking operation using air pressure while generating air pressure with electric power may be achieved.

It should be noted that the number of the buffer members 71 may be only one in other embodiments of the present disclosure. In this embodiment, each of the buffer members 71 is complementary in shape with a combination of a respective one of the grooves 515 and the two slots 516 extending respectively from the two opposite ends of the corresponding one of the grooves 515.

Figure 9:
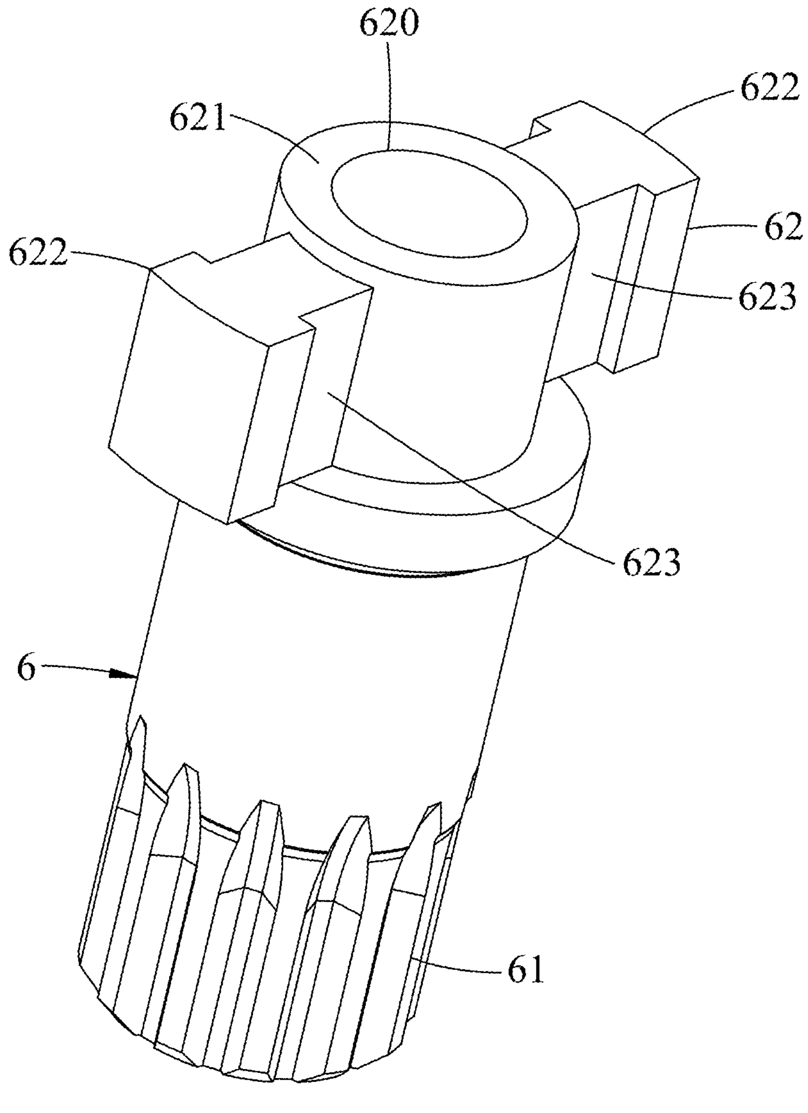
FIG. 9 is a fragmentary perspective view, illustrating a modification of the wheel axle unit of the embodiment.
Figure 10:
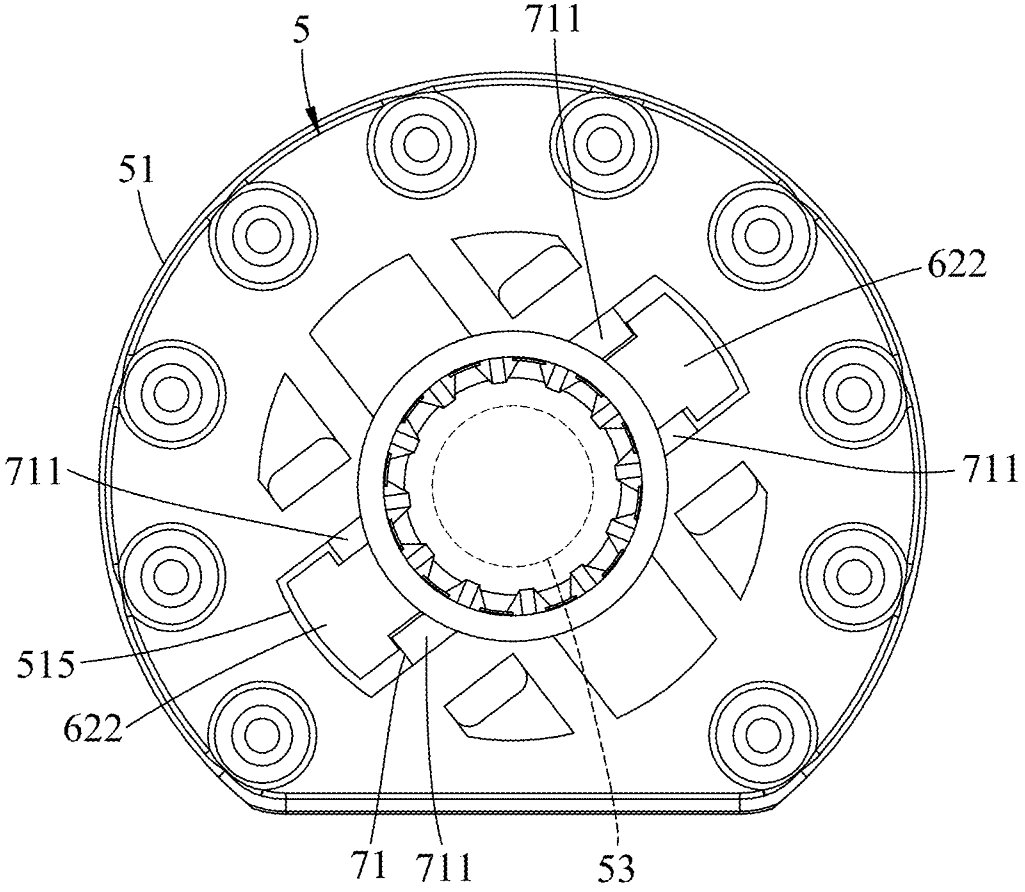
FIG. 10 is a schematic bottom view, illustrating two wing portions of the wheel axle unit being T-shaped.

Referring to FIGS. 9 and 10, a modification of the second transmission part 62 of the wheel axle unit 6 is shown. In the modification, each of the wing portions 622 of the second transmission part 62 of the wheel axle unit 6 is T-shaped. By virtue of such structure, the buffer portions 711 of each of the buffer members 71 are confined between a respective one of the wing portions 622 and the annular body portion 621 of the second transmission part 62.

Through the above description, the advantages of the present disclosure can be summarized as follows.

First, in the present disclosure, the structural relationship among the wheel unit 5, the wheel axle unit 6 and the buffer unit 7 constructs a buffering space, i.e., the first gap (d1) or the second gap (d2), as the strike unit 3 bounces back and forth in the nail-striking direction (X1) and the pressure-generating direction (X2) after striking a nail, and the buffer unit 7 absorbs the force through the buffer portions 711 of each of the buffer members 71. As such, the wheel unit 5 that is undesirably rotated in the clockwise direction does not interfere with the counterclockwise rotation of the wheel axle unit 6, and thus damage to the wheel axle unit 6 and the motor unit 4 may be prevented. In this way, the probability of the wheel body 51 and the strike pin 32 jamming may be significantly decreased, thereby not only prolonging the service life of the motor unit 4, but also achieving a smooth and reliable operation.

Second, when the air pressure in the air storage chamber 220 drops below the predetermined threshold and is insufficient to strike a nail, the rear cover 113 may be easily detached from the housing 112 to expose the air supply valve 23 so that the air supply valve 23 is connected to the external air source to supply air to the air storage chamber 220. Thus, it is quite simple and efficient to maintain the air pressure in the air storage chamber 220 at the predetermined threshold without entirely disassembling the housing 112 or other components of the electric nail gun.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A lift assembly adapted for use in an electric nail gun, the electric nail gun including a main body unit, a strike unit that is operable to start a striking cycle, a cylinder unit that is mounted to said main body unit, that stores air therein, and that is isolated from an external environment during the striking cycle, and a strike pin that is movable in a nail-striking direction by air pressure in the cylinder unit from a pre-striking position to a post-striking position to strike a nail, the strike pin including a driven protrusion, said lift assembly comprising:

- a wheel unit that is rotatable about an axis perpendicular to the nail-striking direction, that is adapted to be mounted to the main body unit, and that includes
  - a plurality of roller members arranged along a circumference surrounding the axis, a selected one of said plurality of roller members being adapted to detachably engage the driven protrusion of the strike pin to thereby drive the strike pin from the post-striking position to the pre-striking position, and
  - an inner action surface movable along the circumference;
- a wheel axle unit that is rotatable about the axis, that is detachably sleeved on a portion of said wheel unit, and that has an outer action surface movable along the circumference, spaced apart from said wheel unit, and operable to exert a force on said inner action surface to drive rotation of said wheel unit when said wheel axle unit is energized; and
- a buffer unit that includes at least one buffer member disposed between said inner action surface and said outer action surface along the circumference;

wherein:

- said wheel unit further includes a wheel body having said roller members and said inner action surface, said inner action surface defining a polygonal axial hole; and
- said wheel axle unit includes a first transmission part, and a second transmission part opposite to said first transmission part along the axis, extending into said polygonal axial hole, and having said outer action surface.

2. The lift assembly as claimed in claim 1, wherein said polygonal axial hole is configured as a cross, and said second transmission part engages said polygonal axial hole.

3. The lift assembly as claimed in claim 1, wherein:

- said wheel body has two disc members spaced apart from each other along the axis; and
- said roller members are disposed between said disc members.

4. The lift assembly as claimed in claim 3, wherein:

one of said disc members of said wheel body has

- a plurality of grooves formed in a surface of said one of said disc members and arranged around the axis, and
- a plurality of slots each extending from a corresponding one of said plurality of grooves along the axis and in spatial communication with said polygonal axial hole; and
- said at least one buffer member includes a plurality of buffer members, each of said plurality of buffer members having
- at least one buffer portion that extends into a respective one of said plurality of slots and that is disposed between said inner action surface and said outer action surface, and
- a connecting portion that is connected to said at least one buffer portion and that engages a respective one of said plurality of grooves.

5. The lift assembly as claimed in claim 4, wherein:

- two of said plurality of slots respectively extend from two opposite ends of the corresponding one of said plurality of grooves along the axis; and
- said at least one buffer portion of each of said plurality of buffer members includes two buffer portions opposite to each other along the circumference and respectively extending into said two of said plurality of slots.

6. The lift assembly as claimed in claim 1, wherein:

- said wheel unit further includes a first shaft member connected to said wheel body and extending along the axis;
- said wheel axle unit extends along the axis and is opposite to said first shaft member along the axis; and
- said lift assembly further comprises a support unit including two ring members, one of said two ring members being disposed between said first shaft member and the main body unit of the electric nail gun and adapted to permit rotation between said first shaft member and the main body unit, another one of said two ring members being disposed between said first transmission part of said wheel axle unit and the main body unit of the electric nail gun, and adapted to permit rotation between said first transmission part and the main body unit.

7. The lift assembly as claimed in claim 6, wherein each of said two ring members is one of a bearing and a bushing.

8. The lift assembly as claimed in claim 6, wherein:

- said wheel unit further includes a second shaft member connected to said wheel body and opposite to said first shaft member along the axis; and
- said wheel axle unit further has a through hole extending from an end surface thereof along the axis, said second shaft member extending into said through hole and connected to said wheel axle unit.

9. An electric nail gun comprising:

- a main body unit that includes a trigger unit operable to start a striking cycle;
- a lift assembly as claimed in claim 1 that is mounted to said main body unit;
- a cylinder unit that is mounted to said main body unit, and that includes
  - an air storage chamber storing air therein and isolated from an external environment during the striking cycle, and
  - a cylinder chamber in spatial communication with said air storage chamber; and
- a strike unit that is inserted in said cylinder chamber, and that includes a strike pin movable in a nail-striking direction by air pressure in said cylinder unit from the pre-striking position to the post-striking position to strike a nail, said strike pin including a driven protrusion.

10. The electric nail gun as claimed in claim 9, wherein said cylinder unit includes an air storage cylinder and a strike cylinder that is disposed in said air storage cylinder and that defines said cylinder chamber therein, said air storage cylinder cooperating with said strike cylinder to define said air storage chamber therebetween.

11. The electric nail gun as claimed in claim 10, wherein:

- said cylinder unit further includes an elastic member disposed in said cylinder chamber, and
- said strike unit is in contact with said elastic member when said strike pin is in the nail-striking position.

12. The electric nail gun as claimed in claim 10, wherein:
said cylinder unit further includes an air supply valve;
said air storage cylinder includes
a storage cylinder body surrounding said strike cylinder, and
a storage cylinder cover connected to said storage cylinder body and cooperating with said storage cylinder body and an outer surface of said strike cylinder to define said air storage chamber; and
said air supply valve is mounted to said storage cylinder cover, and is operable to supply air to said air storage chamber.

13. The electric nail gun as claimed in claim 12, wherein:
said main body unit further includes a main body to which said trigger unit is mounted, said main body including a housing, and a rear cover that is detachably connected to said housing and that cooperates with said housing to define an accommodating space;
said cylinder unit is disposed in said accommodating space;
said storage cylinder cover has a valve hole extending therethrough in a direction of the axis and located between said storage cylinder body and said strike cylinder; and
said air supply valve extends into said valve hole in the nail-striking direction, and is disposed proximate to said rear cover.

14. The electric nail gun as claimed in claim 9, wherein:
said electric nail gun further comprises a motor unit mounted to said main body unit and sleeved on said wheel axle unit; and
said motor unit drives rotation of said wheel axle unit when said trigger unit is operated to start the striking cycle.

* * * * *